UNITED STATES PATENT OFFICE.

WESLEY MILTON OSBORNE, OF CARTHAGE, NEW YORK.

PROCESS FOR REMOVING INK AND COLORING-MATTER FROM PRINTED PAPER.

1,298,779.  Specification of Letters Patent.  Patented Apr. 1, 1919.

No Drawing.  Application filed September 30, 1918. Serial No. 256,309.

*To all whom it may concern:*

Be it known that I, WESLEY M. OSBORNE, a citizen of the United States, residing at Carthage, in the county of Jefferson and State of New York, have invented certain new and useful Improvements in Processes for Removing Ink and Coloring-Matter from Printed Paper; and I do hereby declare the following to be a full, clear, and exact description of the invention, such as will enable others skilled in the art to which it appertains to make and use the same.

This invention relates to new and useful improvements in processes of removing ink and coloring matter from printed papers, and consists essentially in an efficient method whereby the paper reduced to a pulp may be relieved of ink and coloring matter without injuring the fiber, the materials being used so acting upon the pitches of the pulp as to render the same substantially a sulfite fiber after the ink has been entirely removed.

In carrying out my process, the old printed papers are placed in a digester nearly filling the same, and to which is added a weak solution of sulfurous acid, $H_2SO_3$, such as is used in sulfite plants, and to which is added sodium carbonate, $Na_2CO_3$, in powdered form to cause the necessary reaction. In the reaction ensuing the $CO_2$ gas will have a great effect upon the pulp, and sodium sulfite will be formed during the reaction, and which will act as a bleaching agent.

An excess of sulfurous acid is required in order to cause a chemical reaction, and the amount of sodium carbonate may vary along with that of the sulfurous acid. In practice, the sulfurous acid should be of ordinary strength, while the carbonate of soda, or soda ash, is made into a solution, in order to dilute the acid strength, without being too quickly weakened.

I have found that good results may be obtained with two parts of the sulfurous acid to one part of the solution of sodium carbonate. After the ingredients have been placed within the digester, steam is applied, causing a circulation of the papers, slowly at first, until the temperature and pressure rises, and after which the contents of the digester is cooked rapidly, retaining as long as possible the gases which are given off.

When the stock has been sufficiently treated, the digester is blown, the stock washed and screened and ready for direct use in making paper and pressing into laps.

By this process, I have found that a high grade of pulp is obtained, differing slightly from the original sulfite pulp, relieved of pitches, and being of a suitable consistency for use in the making of paper.

What I claim to be new is:

1. A process of removing ink and coloring matter from printed papers, consisting of treating the papers in a digester to the action of sulfurous acid and sodium carbonate, applying heated steam to the solution, causing the papers to circulate, slowly at first, gradually raising the temperature and pressure, and cooking the contents of the digester rapidly.

2. A process of removing ink and coloring matter from printed papers, consisting of treating the papers in a digester to the action of sulfurous acid and sodium carbonate, applying heated steam to the solution, causing the papers to circulate, slowly at first, gradually raising the temperature and pressure, and cooking the contents of the digester rapidly, the pulp being bleached by the sodium sulfite produced by the reaction of the sulfurous acid and sodium carbonate.

3. A process of removing ink and coloring matter from printed papers, consisting of treating the papers in a digester to the action of sulfurous acid and sodium carbonate, the proportion of sulfurous acid being in excess of the sodium carbonate, applying heated steam to the solution, causing the papers to circulate, slowly at first, gradually raising the temperature and pressure, and cooking the contents of the digester rapidly.

In testimony whereof I hereunto affix my signature in presence of two witnesses.

WESLEY MILTON OSBORNE.

Witnesses:
GEORGE C. OSBORNE,
T. IRENE OSBORNE.